United States Patent
Wang et al.

[11] Patent Number: 5,933,763
[45] Date of Patent: Aug. 3, 1999

[54] CIRCUITRY AND METHOD FOR IMPROVED SIGNAL RECEPTION ACKNOWLEDGMENT IN A RADIO COMMUNICATION SYSTEM

[75] Inventors: Eric Yi-Pin Wang; Kumar Balachandran; Amer Hassan; Sandeep Chennakeshu, all of Cary, N.C.

[73] Assignee: Ericsson Inc, Research Triangle Park, N.C.

[21] Appl. No.: 08/764,672

[22] Filed: Dec. 11, 1996

[51] Int. Cl.⁶ .............................. H04Q 7/08; H04Q 7/10; H04Q 7/12

[52] U.S. Cl. ................. 455/31.3; 455/31.2; 455/38.1; 455/550; 455/552

[58] Field of Search ................................. 455/31.3, 31.2, 455/38.3, 37.1, 38.1, 434, 445, 561, 550, 560, 552; 340/825.44, 991, 825.47

[56] References Cited

U.S. PATENT DOCUMENTS 5,708,971  1/1998  Dent ........................................ 455/38.3
5,715,516  2/1998  Howard et al. ......................... 455/31.3
5,809,090  9/1998  Buternowsky et al. ................ 455/31.3

FOREIGN PATENT DOCUMENTS

WO 81 00034  8/1981  WIPO .
WO 96 08941  3/1996  WIPO .
WO 96 28944  9/1996  WIPO .

Primary Examiner—Wellington Chin
Assistant Examiner—Keith Ferguson
Attorney, Agent, or Firm—Jenkens & Gilchrist

[57] ABSTRACT

A method and associated circuitry for initiating communication between a network station and a user terminal of a radiotelephonic communication system, such as a satellite-cellular communication system. When communication is to be initiated, a paging signal is transmitted by a network station to the user terminal. When the user terminal detects the paging signal, an acknowledgment signal is generated by the user terminal and encoded to increase the margin of the acknowledgment signal. Upon reception, the acknowledgment signal is correlated using a multiplicity of correlators. An increased margin acknowledgment signal acknowledging reception of the paging signal is transmitted to facilitate communication of the acknowledgment signal back to the network station.

20 Claims, 3 Drawing Sheets m-sequence

CIRCUITRY AND METHOD FOR IMPROVED SIGNAL RECEPTION ACKNOWLEDGMENT IN A RADIO COMMUNICATION SYSTEM

BACKGROUND OF THE PRESENT INVENTION

FIELD OF THE INVENTION

The present invention relates generally to radiotelephonic communication systems such as a terrestrial-cellular communication system or a satellite-cellular communication system. Particularly, the present invention relates to circuitry, and an associated methodology, for initiating communications with a user terminal, i.e., a radiotelephone, operable in such a radiotelephonic communication system. More particularly, the present invention relates to circuitry, and an associated methodology, for the improved reception and correlation of an acknowledgment signal transmitted by the user terminal in the radiotelephonic communication system.

To initiate communications with the user terminal, a paging signal is transmitted from a broadcast station to the user terminal to page the user terminal. When the user terminal receives the paging signal, the user terminal returns an acknowledgment signal acknowledging reception of the paging signal. The user terminal might be operating in an environment in which the acknowledgment signal might be significantly attenuated. The possibility of significant levels of attenuation which prevent adequate communication of the acknowledgment signal is particularly problematical when the user terminal is operable in a satellite-cellular communication system, and the acknowledgment signal must be transmitted over a significant distance to a satellite-based transceiver.

To facilitate communication of the acknowledgment signal, the "margin" of the acknowledgment signal is increased to distinguish better the acknowledgment signal over background noise. As the power level of the user terminal is limited and cannot normally be increased, the margin of the acknowledgment signal cannot be increased by increasing its power level. Instead, by encoding the acknowledgment signal according to a selected encoding technique, the margin of the acknowledgment signal is increased and reception improved. In this manner, communication of the acknowledgment signal is facilitated. By acknowledging reception of the paging signal, repeated transmission of paging signals to the user terminal, once the radio telephone has received the paging signal, is avoided. And, if an acknowledgment signal is not detected, the paging signal is retransmitted at a higher margin level, such as by increasing the power level of the paging signal or by encoding the paging signal according to a different encoding scheme or a combination thereof. The result of the repetitive paging is, of course, a drain on satellite and other system resources.

BACKGROUND AND OBJECTS OF THE PRESENT INVENTION

A communication system is formed, at a minimum, of a transmitter and a receiver interconnected by a communication channel. The communication system is operable at least to transmit communication signals, having an informational content, generated at, or applied to, the transmitter. The communication signals are transmitted to the receiver through the communication channel. The receiver is operable to receive the transmitted communication signal and to recreate the informational content of the communication signal.

A radio communication system is a communication system in which the communication channel is formed of one or more frequency bands of the electromagnetic frequency spectrum. A transmitter operable in a radio communication system generates a communication signal of characteristics permitting its transmission through the communication channel, and the receiver operable in the radio communication system permits reception of the communication signal transmitted through the communication channel.

Typically, the radio receiver includes tuning circuitry tunable to the frequencies of the communication channel through which the communication signal is transmitted, down-conversion circuitry for down-converting a receive signal formed of the communication signal from a transmission frequency into a lower frequency signal, demodulation, and decoder circuitry which permit the informational content of the communication signal to be recreated.

A cellular communication system is a type of radio communication system. When the infrastructure, hereinafter referred to as the network, of the cellular communication system is installed in a geographical area, a subscriber to the cellular system is generally able to communicate telephonically in the system when positioned at any location in the geographical area encompassed by the system.

Cellular communication networks have been installed throughout significant portions of at least many of the world's population centers. Large numbers of subscribers to cellular communication systems formed of such cellular networks are able to communicate telephonically when positioned in areas encompassed by such cellular networks.

However, in some areas, such as areas not proximate to population centers, conventional, i.e., terrestrial, cellular communication networks have not been installed. In areas of low population density, for instance, a terrestrial-cellular communication network might not be commercially viable and is not installed.

The terrestrial-cellular communication networks which have already been installed have also been constructed pursuant to various different standards. A user terminal operable in one of the cellular communication systems is sometimes not operable in others of the cellular communication systems.

Therefore, even in an area in which a cellular communication network has been installed, a user might not be able to communicate by way of the cellular communication network if the user attempts to utilize a user terminal constructed to be operable only with another one of the cellular communication networks.

Satellite-cellular communication systems have been proposed which, when implemented, shall permit a user, utilizing a user terminal operable therein, to communicate telephonically by way of the satellite-cellular communication system when positioned at almost any location. By transmitting down-link and other signals between a satellite-based transceiver and the user terminal and up-link signals between the user terminal and the satellite-based transceiver, telephonic communication shall be possible between the user terminal and the satellite-based transceiver. By effectuating additional communication links between the satellite-based transceiver and a ground station, the user of the user terminal shall be able to communicate telephonically with another party by way of the ground station and the satellite-based transceiver.

When a call is to be placed to a user terminal, supervisory communication signals are first transmitted to the user terminal. The user terminal must be informed of the call placement so that, inter alia, the user terminal can be tuned to a proper communication channel to receive and to transmit communication signals pursuant to the call.

To initiate the communications, a network station, either the satellite-based transceiver, or in a terrestrial-cellular communication system, a base station, transmits a paging signal to the user terminal. Repeated transmission of a paging signal might unnecessarily occur if the network station fails to receive timely indications of reception by the user terminal of the paging signal.

The paging signal must be of a "margin" great enough for the user terminal to detect the signal. The margin of the signal is the amount of power of the signal available to a receiver over a nominal level that permits adequate detection by the receiver of the signal over Gaussian noise levels. The margin of a signal is sometimes expressed in terms of decibels (dB) over a required signal-to-noise (SNR) ratio or for a particular service quality. The margin of a signal can be increased by increasing its power level, by encoding the signal, and by repeating the signal. An acknowledgment signal can be generated by the user terminal to acknowledge its receipt of the paging signal. Analogous to the margin required of the paging signal, the acknowledgment signal must be of a margin great enough for the network station or an orbiting satellite-based transceiver to detect the signal.

As the user terminal is of a limited power capacity, the power level of an acknowledgment signal transmitted by the user terminal to the network station cannot be increased indiscriminately to increase the margin of the acknowledgment signal. Therefore, when the communications must be effectuated upon a transmission channel exhibiting a high level of attenuation, the acknowledgment signal might not be able to be adequately communicated to the network station.

What is needed, therefore, is a manner by which to minimize the number of paging signals required to be transmitted by a network station to initiate communications between a network station and a user terminal. What is also needed, therefore, is a manner by which to acknowledge, with a high margin signal, reception of a paging signal at a user terminal. What is further needed, therefore, is a manner by which the aforementioned high-margin acknowledgment signal, transmitted by the user terminal, is properly received under various environmental and operational circumstances.

It is in light of this background information related to communications pursuant to a radiotelephonic communication system, such as a satellite-based or terrestrial-based cellular communication system, that the significant improvements of the present invention have evolved.

It is, accordingly, an object of the present invention to provide a system and methodology for producing and transmitting the aforedescribed high-margin acknowledgment signal, and for receiving and correlating the transmitted signal.

It is an additional object of the present invention to provide a system and methodology for producing, transmitting, receiving and correlating said signal under less than ideal conditions, such as in the presence of unknown timing and large frequency error, e.g., Doppler effects.

It is a further object of the present invention to reduce the complexity and increase the accuracy in the reception and correlation of the aforementioned received acknowledgment signal.

SUMMARY OF THE INVENTION

The present invention advantageously provides circuitry, and an associated methodology, for initiating communications with a user terminal operable in a radiotelephonic communication system.

Transmission of paging signals required to initiate communications with the user terminal are minimized. A paging signal is transmitted by a network station to page the user terminal. When the user terminal receives the paging signal, the user terminal returns an acknowledgment signal acknowledging reception of the paging signal.

As the user terminal might be operating in an environment in which the acknowledgment signal might be significantly attenuated, the margin of the acknowledgment signal is increased by encoding the acknowledgment signal pursuant to a selected encoding technique. The margin of the acknowledgment signal is thereby increased without increasing the power level at which the acknowledgment signal must be transmitted by the user terminal. The margin of the acknowledgment signal and accuracy is further increased by the use of a multiplicity of correlators, each correlating a portion or subsequence of the acknowledgment signal.

The communication bandwidth required of the network station to initiate the communications with the user terminal is minimized. The present invention is advantageously embodied in both a terrestrial-cellular communication system and a satellite-cellular communication system. Repeated paging of the user terminal is avoided. And, if no acknowledgment signal is detected by the network station, the margin level of paging signals generated by the network station is increased to increase the probability of successful communication of the paging signals to the user terminal. The margin level is increased, e.g., by increasing the power level of the signal or by encoding the signal with a more robust encoding scheme.

In one aspect of the present invention, communication in a cellular satellite communication system having at least a satellite-based transceiver and a user terminal is initiated. The user terminal is paged with a paging signal transmitted by the satellite-based transceiver. An acknowledgment signal generated at the user terminal is returned to the satellite-based transceiver to acknowledge reception by the user terminal of the paging signal.

In another aspect of the present invention, a paging signal is transmitted upon a forward-link channel at a first power level. The paging signal includes a power level indicating portion for indicating the power level at which the paging signal is transmitted. If reception of the paging signal is not acknowledged within a selected time period, the paging signal is retransmitted at an increased power level, thereby to increase the probability of successful communication of the paging signal. Alternatively, the paging signal is re-encoded by an encoding scheme of increased robustness, or the margin of the paging signal is increased in some other manner and then retransmitted.

In either aspect of the present invention, a multiplicity of correlators are used to analyze signals indicative of an acknowledgment by the user terminal. Each such signal is partitioned into a corresponding multiplicity of subsequences, each of which is passed through the respective correlators for verification. In one embodiment of the present invention, a signal is partitioned into a corresponding multiplicity of subsequences each correlated by a respective correlator. In another embodiment of the present invention, a multiplicity of identical, short acknowledgment signals are transmitted within a transmission burst and each correlator correlates a respective short signal within the lengthier transmission burst.

In these and other aspects, therefore, a communication initiation method, and associated circuitry, initiates communication by a first radio communication station with a second radio communication station. A paging signal is transmitted from the first radio communication station upon a forward-link channel. The paging signal is transmitted at a first margin level, and the paging signal includes a margin level indicating portion for indicating the margin level at which the paging signal is transmitted. The paging signal is retransmitted from the first radio communication station upon the forward-link channel if the second radio communication station fails to acknowledge reception of the paging signal within a selected time period. The paging signal is retransmitted at a second margin level wherein the second margin level is greater than the first margin level. The retransmitted paging signal again includes the margin level indicating portion for indicating the margin level at which the paging signal is retransmitted.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
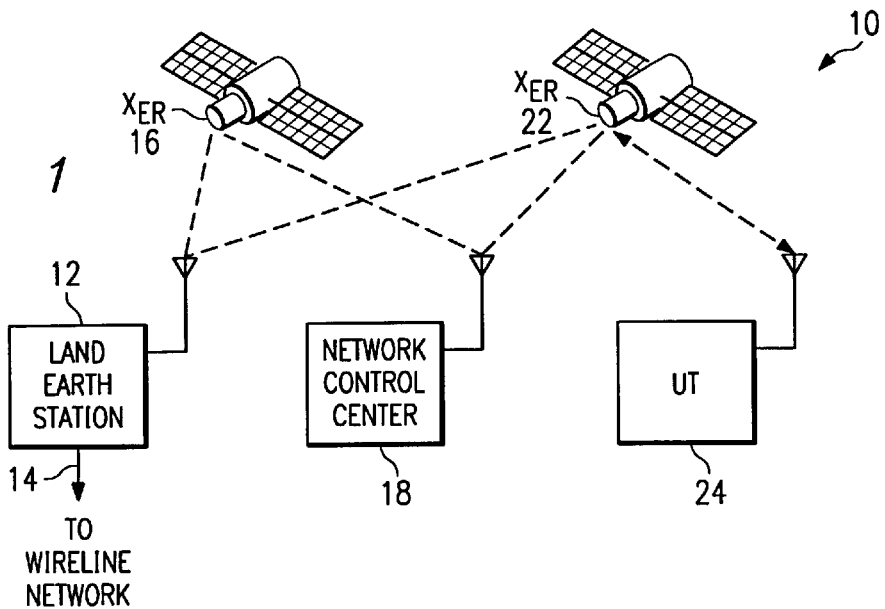
FIG. 1 illustrates a functional block diagram of a satellite-cellular communication system which embodies the circuitry and method of an embodiment of the present invention.

Referring first to FIG. 1, a satellite-cellular communication system, shown generally at 10, includes the circuitry, and associated methodology, of an embodiment of the present invention. It should be noted at the outset that, while the communication system 10 is illustrated to be a satellite-cellular communication system, the present invention can analogously be embodied in a terrestrial-cellular, or other radiotelephonic, communication system. For instance, as one skilled in the art shall appreciate, by appropriate substitution of terrestrial-based base stations for certain of the satellite-based transceivers of a satellite-cellular communication system, a terrestrial-cellular communication system can instead be formed.

The communication system 10 includes a land Earth station 12 which is coupled, here represented by lines 14, to a wireline telephonic network. The land Earth station 12 includes transceiver circuitry for transceiving communication signals, inter alia, with a satellite-based transceiver 16.

The satellite-based transceiver 16 is operable to transceive communication signals not only with the land Earth station 12 but also with other land-based devices, such as transceiver circuitry of a network control center 18. The transceiver 16 is primarily operable as a relay to relay signals generated at the land Earth station 12 to the network control center 18 and vice-versa. The transceiver is preferably able to receive signals on any frequency channel and relay the signal on another frequency channel.

The transceiver circuitry of the network control center 18, in turn, is able to transceive communication signals with other satellite-based transceivers, such as the transceiver 22. The transceiver 22, similar to the transceiver 16, is able to transceive communication signals with land-based transceivers including, for example, a user terminal 24. Analogous to the transceiver 16, the transceiver 22 is primarily operable as a relay to relay signals transmitted thereto. The transceiver circuitry of the illustrated devices each include a plurality of transceiving elements to permit concurrent communication between large numbers of communication stations.

Communication pursuant to a satellite-cellular communication system, such as the system 10 shown in FIG. 1, permits a user of a user terminal, such as user terminal 24, to communicate telephonically when positioned at any location throughout large areas of the world. As long as the user of the user terminal 24 is positioned to permit transmission and reception of communication signals with a satellite-based transceiver, such as one of the transceivers 16 and 22, the user is able to communicate telephonically with a user of another user terminal or to a telephonic device of a conventional, wireline network. Because of the almost-worldwide scope permitted of a satellite-cellular communication system, the user of the user terminal 24 need not be concerned with the compatibility of the user terminal with a local, cellular system. The user is further capable of communicating telephonically in an area which does not otherwise have an installed cellular, or wireline, telephonic network.

For instance, when the land Earth station 12 (i.e., a telephone device coupled thereto) initiates a call to the user terminal 24, an indication of the initiation is provided to the network control center 18 by way of the transceiver 16. The network control center generates control signals, including paging signals, which are provided to the terminal 24 by way of the transceiver 22. Once call set-up is successfully completed, voice channels between the land Earth station and the user terminal are defined to permit two-way communication between the land Earth station and the user terminal, by way of the transceiver 22.

As mentioned previously, power limitations limit the maximum power levels at which signals generated by a user terminal can be transmitted, significant distances separate satellite-based transceivers and the user terminals, and significant expenses are required to be expended to position the satellite-based transceivers in orbit. Communication systems that are being developed are being developed in manners which attempt to minimize the bandwidth required to communicate communication signals and to increase the margin of signals generated by the user terminals operable in such communication systems.

For instance, when a call is to be placed to a user terminal, supervisory and control signals must first be sent to the terminal. Such signals are transmitted, for example, to inform the user terminal of the incoming call and to cause the user terminal to be tuned to transceive communication signals pursuant to such call. Included amongst the supervisory and control signals transmitted to the user terminal is a paging signal to alert the user terminal of the incoming call. When the user terminal is paged, the user terminal might not be positioned to receive the paging signal. The paging signal must be repeated in such instances so that the user terminal receives the paging signal.

Co-pending, commonly-assigned patent application Ser. No. 08/559,692, filed on Nov. 15, 1995, relating to transmission techniques for high penetration short message service discloses a paging scheme which facilitates paging of a user terminal when the paging signal is subjected to significant amounts of attenuation. The contents of such application are hereby incorporated herein by reference.

During operation of an embodiment of the present invention, when a user terminal, such as the user terminal 24, receives a paging signal, either transmitted on a regular paging channel or a high penetration short message service channel, such as that disclosed in the aforementioned disclosure, the user terminal acknowledges reception of the paging signal with an acknowledgment signal.

Co-pending commonly-assigned patent application Ser. No. 08/626,182, filed Mar. 29, 1996, entitled: "Circuitry and Method for Initiating Communication Between Communication Stations of a Radio Communication System", also discloses a paging scheme where the margin of the acknowledgment signal is increased by encoding the acknowledgment signal to facilitate better the communication of the acknowledgment signal. If the acknowledgment signal is not received within a selected time period, a paging signal is again generated by the communication system, but at an increased power level. In such manner, redundant paging signals are not generated in the event that the user terminal receives the paging signal and the margin of the paging signal is increased by increasing its power level when the paging signal is not acknowledged to have been received by the user terminal. The paging signal may alternatively first be encoded to increase its margin. The contents of this application are also hereby incorporated herein by reference.

Figure 2:
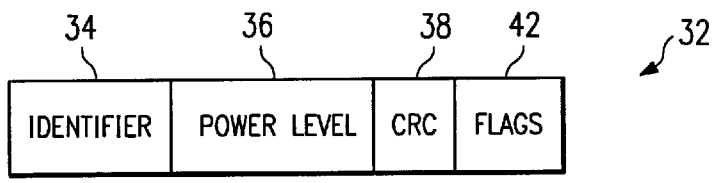
FIG. 2 illustrates information contained in a paging signal which is utilized during operation of an embodiment of the present invention.

FIG. 2 illustrates the information contained in a paging signal, here shown generally at 32, transmitted during operation of the communication system 10 to page a user terminal.

The paging signal is transmitted upon a paging channel, PCH, which in one communication protocol is of a signal length of four bursts, each burst being formed of one hundred fifty-six bits. As also described in the aforementioned, co-pending patent applications, a high-margin, high penetration short message service signal can instead be utilized to page a user terminal. The informational content of a paging signal transmitted either upon a normal paging channel or a channel upon which the high penetration short message service signal is transmitted is similar.

The paging signal 32 illustrated in the figure includes a user terminal identifier code 34. The identifier code is of a value which uniquely identifies a user terminal, such as the user terminal 24 shown in FIG. 1. The identifier 34 may, for instance, be formed of a Temporary Mobile Subscriber Identity (TMSI) or International Mobile Subscriber Identity (IMSI) value defined in The Association of SouthEast Asian Nations' (ASEAN) cellular satellite (ACeS) communication system. When a user terminal receives a paging signal, the value of the identifier 34 identifies the user terminal which is being paged.

As set forth in more detail within said co-pending patent application Ser. No. 08/626,182, the paging signal 32 further includes a power level indicator 36 indicating the power level at which the paging signal is transmitted, which can be between two power levels for a one-bit code or $2^n$ power levels for an n-bit code. Alternatively, the paging signal 32 may include an indicator for the particular encoding scheme used to encode the paging signal.

As further shown in FIG. 2, the paging signal 32 further includes coding bits 38, here cyclic redundancy code, CRC, bits, conventional in nature. The paging signal further includes flag bits 42 utilized for other purposes.

The paging signal 32, in one embodiment, is encoded by a suitable encoding technique to facilitate its communication to a user terminal. The paging signal when received by a user terminal identified by the identifier 34 provides the user terminal with an indication of the incoming call.

As set forth in more detail in said co-pending patent application Ser. No. 08/626,182, when the user terminal receives the paging signal 32, an acknowledgment signal, formed of an encoded signal is transmitted back to a network station. The acknowledgment signal is derived from the TMSI or IMSI forming the identifier code 34 and the power level indicator 36 of the paging signal is used to select the encoding scheme used to encode the acknowledgment signal. When, for instance, the paging signal 32 is transmitted at a normal power level, the acknowledgment signal is encoded in one manner, and when the power level of the paging signal is boosted to be of a higher power level, the acknowledgment signal is encoded in a second manner.

In an alternate embodiment set forth in the aforementioned co-pending patent application Ser. No. 08/626,182, the user terminal generates an acknowledgment signal a plurality of times. It should of course be understood that a network station, such as network control center 18, correlates the received acknowledgment signals with expected signals known to the network station to ensure that the acknowledgment signal is the correct acknowledgment to the page. The details of this acknowledgment signal and the correlation thereof will be discussed hereinafter.

Figure 3:
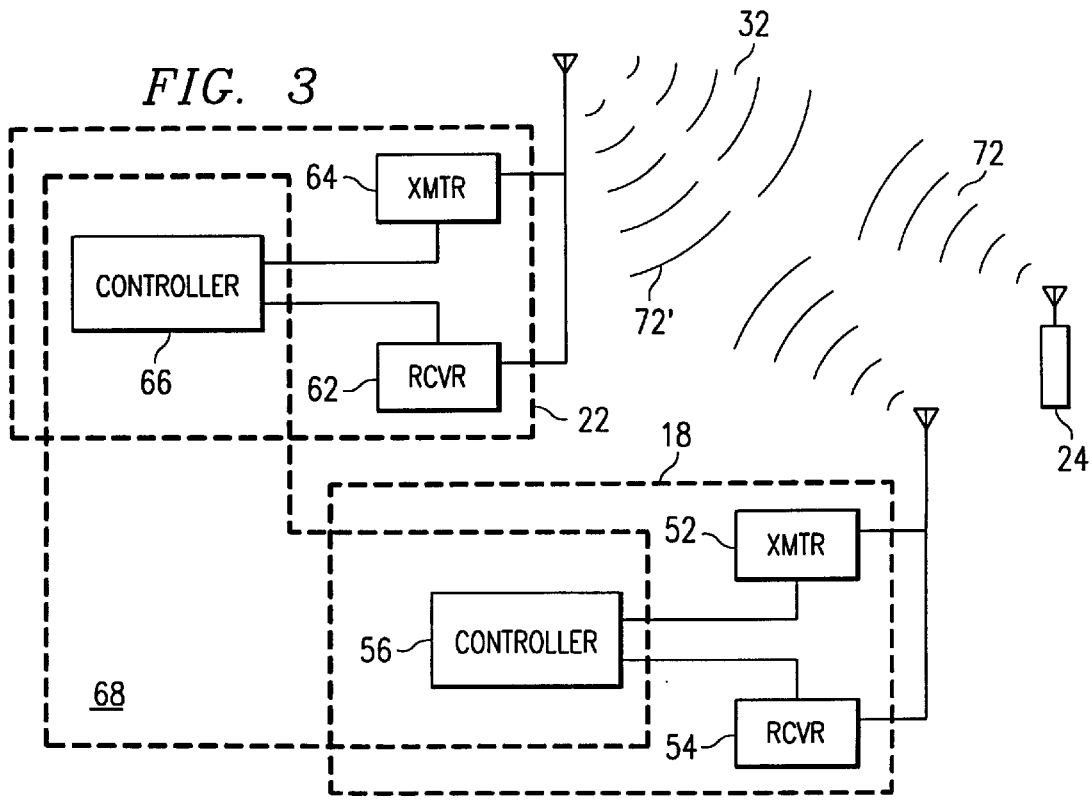
FIG. 3 illustrates in greater detail portions of the communication system shown in FIG. 1.

FIG. 3 illustrates again the network control center 18, transceiver 22 and user terminal 24 shown previously in FIG. 1. When a call is to be placed to the user terminal 24, the network control center initiates transmission of a paging signal which is transmitted to the user terminal 24 by way of the transceiver 22. The network control center 18 includes transceiver circuitry, here shown to be formed of a transmitter 52 and a receiver 54. The transmitter and receiver 52 and 54 are coupled to a controller 56. The controller 56 is operable to form and cause transmission of a paging signal by the transmitter 52 to the transceiver 22 to be received by the receiver 62 thereof.

The transceiver 22 is further shown to include a transmitter 64 and a controller 66. Once the signal generated by the network control center 18 is received by the receiver 62 of the transceiver 22, the controller 66 causes the transmitter 64 to transmit the paging signal 32 to the user terminal 24. The transceiver 22 thereby functions as a relay to relay on the paging signal generated at the network control center 18.

The controller 66 is operative, e.g., to alter the frequency channel through which the paging signal is relayed on to the user terminal. The controllers 56 and 66 together control transmission of the paging signals and together form a control element 68.

If the user terminal 24 detects the paging signal transmitted thereto, the terminal 24 generates an acknowledgment signal 72 for transmission back to the network control center 18 by way of the transceiver 22, within which the acknowledgment signal is received by the receiver 62 and relayed on by the transmitter 64 to be received by the receiver 54 of the network control center 18.

It should be understood that the transmission of the paging signal 32, such as a high power short message service (HP-SMS), is usually delivered with a link margin of about 27–30 dB over additive white Gaussian noise (AWGN) by having the transmission station, e.g., network control center 18, increase the transmitted power by about 7–10 dB. In this way a phone or other user terminal may be reached by a short HP-SMS or alert message, e.g., a phone number or beep, even inside a building or tunnel where the channel link margin is usually far from being sufficient for reliable voice communication. Although a reciprocal equivalent link margin is desired from the user terminal, e.g., a radiotelephone, it is not possible to raise the phone transmitted power due not only to bio-hazard regulations but also to restrictions on phone electronics. One way to deliver the requisite 27–30 dB reciprocal margin is set forth in the aforementioned co-pending patent application Ser. No. 08/626,182.

Figure 4A:
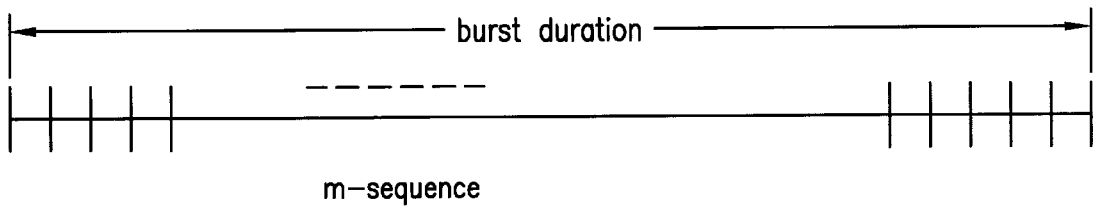
FIG. 4A illustrates a conventional transmission burst containing an acknowledgment signal therein.

With reference now to FIG. 4A, there is shown an example of a transmission burst, such as in a conventional timeslot in, for example, a Time Division Multiple Access (TDMA) frame. Within the timeslot is an encoded m-sequence acknowledgment signal 72 which has a length substantially equal to the burst length of the timeslot transmission. In said co-pending patent application Ser. No. 08/626,182, the m-sequence is a high margin random access channel (HM-RACH) acknowledgment signal 72, only one such signal 72 being transmitted in a given burst.

The controller 56 of the network control center 18 determines whether the received signal forms the requisite acknowledgment signal generated by the selected user terminal 24 by a correlation process. If the received signal properly correlates, call placement to the user terminal 24 is permitted to continue. If the controller 56 determines that the proper acknowledgment signal has not been received, the controller 56 causes retransmission of the paging signal with appropriate alteration of the value of the power level indicator 36 portion thereof. The paging signal retransmitted by the transmitter 64 is of a boosted power level to increase the likelihood that attenuation of the signal can be overcome so that the user terminal 24 receives the paging signal. The user terminal 24 then responds with the requisite acknowledgment signal.

One problem with the HM-RACH acknowledgment signal 72 and correlation process described in said co-pending patent application Ser. No. 08/626,182, however, is that the aforementioned correlation process, involving a complicated and precise bit-wise comparison of the possible acknowledgment signal with a stored pattern representing the actual acknowledgment signal, is possible generally only under ideal conditions, e.g., where the carrier phase remains constant. This is problematic in that during normal multiphase operations the phase may rotate around the circle many times across the duration of the message, thereby interfering with the correlation process. Additional circuitry is then required to assist correlation.

Additional problems with the aforementioned process are frequency and timing errors, either of which may also adversely affect correlation. These correlation problems are chiefly due to the use of a single correlation filter to perform the aforedescribed correlation using the technology set forth in the above co-pending application. It should, therefore, be understood that correlation of the entire m-sequence signal is difficult, if not impossible, unless ideal conditions are present or a bank of discrete filters are used, each matched to a different frequency offset. This, however, requires additional hardware and computational complexity, resulting in a dramatic increase in size and cost. Accordingly, the present invention sets forth an improvement over the previous solution set forth in said co-pending patent application Ser. No. 08/626,182.

Figure 4B:
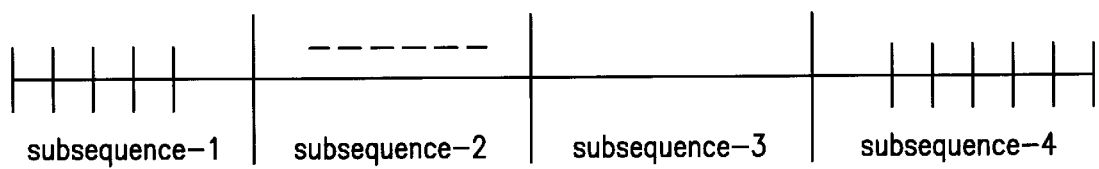
FIG. 4B illustrates a partitioning of the acknowledgement signal shown in FIG. 4A into a multiplicity of subsequences in accordance with a first, second and third embodiments of the present invention.

With reference now to FIG. 4B, there is shown a first embodiment of the present invention by which the aforedescribed m-sequence of FIG. 4A is partitioned upon reception into a multiplicity of segments or subsequences, preferably of equal length N/M, where N represents the number of bits in the transmission burst and M represents the number of partitions/subsequences. In the example set forth in FIG. 4B, M equals 4. It should be understood by those skilled in the art that the value of N is dependent upon the worst-case Doppler the system has to operate on, e.g., for fast vehicle speeds N should be small. A corresponding number of correlators in the receiver 54 of the network control center 18 are respectively matched to a distinct subsequence partition of the original m-sequence in a conventional manner. It should be understood that the number M is chosen such that the channel does not change considerably during subsequence transmission.

Figure 5:
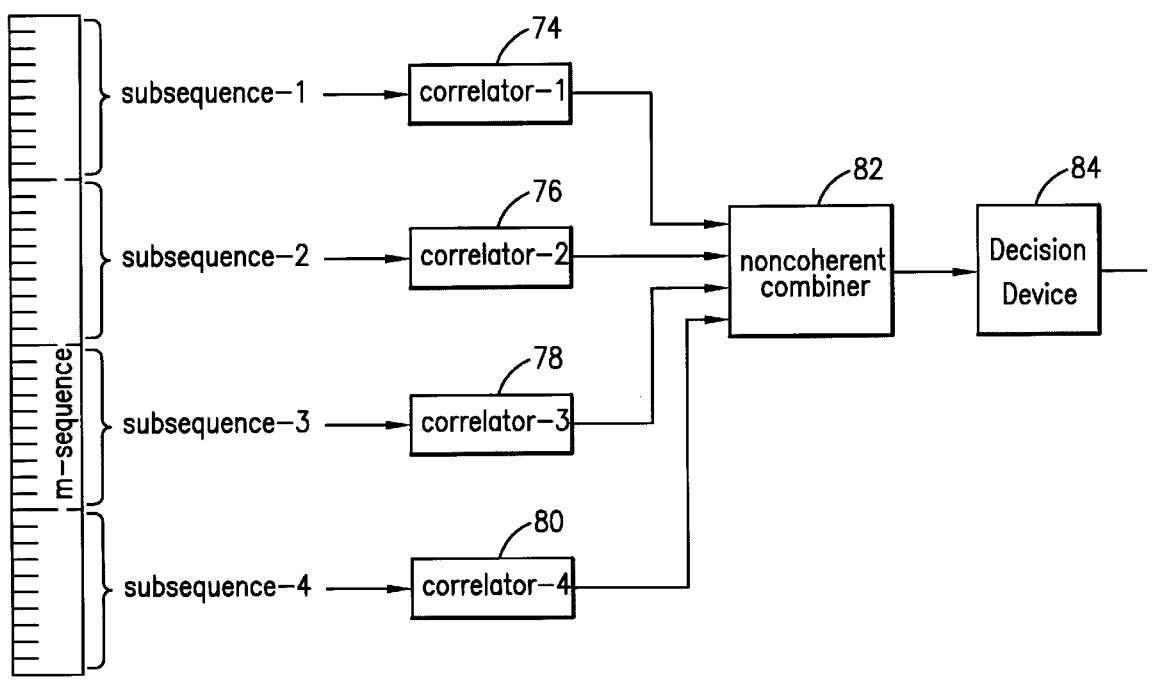
FIG. 5 illustrates a series of correlators for correlating the subsequence partitions in FIG. 4.

With reference now to FIG. 5, the M correlators, four in the figure, i.e., 74, 76, 78 and 80, are matched with the corresponding subsequence, e.g., correlator 74 is matched to subsequence-1 of the m-sequence signal, etc., and the correlation results of the respective correlators combined in a conventional manner within a noncoherent combiner 82. The combinatory result is then forwarded to a decision device 84 which makes a decision whether the aforedescribed acknowledgment signal 72 has been received or if another page is necessary.

It should, of course, be understood that the respective subsequences of the m-sequence signal received by the receiver 54 usually contain different bit-patterns than that of the other subsequences, as would be expected in dividing a lengthy message into constituent parts. Consequently, each correlator generally contains a different bit-pattern representing the respective portion of the actual acknowledgment signal 72 for comparison purposes. The different correlations in the correlators 74, 76, 78 and 80 are then forwarded to the combiner 82, as described.

With reference again in FIG. 4B, in a second embodiment of the present invention each of the subsequences within the burst contains the aforedescribed acknowledgment signal, albeit a shorter version thereof than the entire m-sequence utilized in the first embodiment. Each correlator 74, 76, 78 and 80 in this embodiment contains the same bit-pattern representing the whole, albeit shorter, acknowledgment signal 72. The advantage in this arrangement is that the correlation properties of the constituent identical "subsequences" are guaranteed to exhibit good correlation behavior as opposed to the distinct and different subsequences of a burst-length m-sequence.

In an effort to enhance the performance it should be understood that distinct subsequence messages may be employed instead of repetitively using the same subsequence as in the second embodiment. In this third embodiment of the present invention, which is dependent upon the complexity of the system and its ability to handle the load, the acknowledgment signal may be detected with a higher probability of success. If distinct subsequences are used, the different subsequences should have adequate cross-correlation.

Operation of the present invention facilitates communication in a radiotelephonic communication system, such as a satellite-cellular communication system or a terrestrial-cellular communication system. By providing an acknowledgment signal responsive to reception of a paging signal, redundant paging is avoided and satellite power is more efficiently utilized. And, because the margin of the acknowledgment signal is increased without increasing the power level of the acknowledgment signal, communication of the acknowledgment signal can be effectuated even when the acknowledgment signal must be transmitted upon a transmission channel exhibiting high levels of attenuation. Further, by separately correlating portions of the m-sequence signal received, the aforedescribed problems encountered in the use of the technology of the co-pending patent application Ser. No. 08/626,182 are minimized, facilitating communication in a more efficient and cost-effective manner.

It should be understood that the paging signal and acknowledgment signal transmitted over the communications channel may emanate from a satellite transceiver of a satellite-cellular communication system and a user terminal within that system.

It should also be understood that the paging signal may constitute a conventional paging signal in a satellite or terrestrial-based communications system or high penetration short message service signals therein.

The previous descriptions are of preferred examples for implementing the invention, and the scope of the invention should not necessarily be limited by this description. The scope of the present invention is defined by the following claims.

What is claimed is:

1. In a radio communication system having a first radio communication station and a second radio communication station, a combination with the first radio communication station of communication initiation circuitry for initiating communication with the second radio communication station, said communication initiation circuitry comprising:

a transmitter, attached to said first radio communication station, for transmitting a paging signal of a selected margin level upon a forward-link channel to the second radio communication station;

a controller, attached to said first radio communication system and said transmitter, for receiving indications of reception at the first radio communication station of an acknowledgment signal transmitted thereto acknowledging reception at the second radio communication station of the paging signal, said controller including a multiplicity of correlators therein, each said correlator correlating a respective subsequence of said received acknowledgment signal, the number of said correlators being equal to the number of subsequence partitions of said acknowledgment signal, said controller for detecting times in which the second radio communication station fails to acknowledge reception of the paging signal, said controller further for causing said transmitter to retransmit the paging signal at an increased margin level responsive to times detected thereat in which the second radio communication station fails to acknowledge the reception of the paging signal.

2. The communication circuitry according to claim 1, wherein said first and second radio communication stations communicate over said channel using a series of transmitted bursts therebetween, said acknowledgment signal being transmitted from said second radio communication station to said first radio communication station over at least one of said bursts.

3. The communication circuitry according to claim 1, wherein said acknowledgment signal received at said first radio communication station is a single signal, each of said correlators correlating a respective portion of said signal.

4. The communication circuitry according to claim 1, wherein said acknowledgment signal received at said first radio communication station comprises a multiplicity of subsignals therein, said multiplicity of subsignals corresponding to said multiplicity of correlators, and each of said correlators correlating a respective one of said multiplicity of subsignals.

5. The communication circuitry according to claim 4, wherein each of said multiplicity of subsignals are identical.

6. The communication circuitry according to claim 4, wherein each of said multiplicity of subsignals are different.

7. The communication circuitry according to claim 4, wherein at least two of said multiplicity of subsignals are different.

8. The communication circuitry according to claim 4, further comprising:

a combination element within said controller coupled to each of said multiplicity of correlators for receiving the respective multiplicity of said subsignals corresponding thereto and combining said subsignals.

9. The communication circuitry according to claim 8, further comprising:

a decision element within said controller coupled to said combination element and receiving the combination of said subsignals, said decision element for determining said reception of and said failure to detect said acknowledgment signal.

10. The communication circuitry according to claim 1, further comprising:

a combination element within said controller coupled to each of said multiplicity of correlators for receiving the outputs of the correlations therein and combining said outputs.

11. The communication circuitry according to claim 10, further comprising:

a decision element within said controller coupled to said combination element and receiving said combination of correlation outputs, said decision element for determining said reception of and said failure to detect said acknowledgment signal.

12. The communication circuitry according to claim 1, wherein said first radio communication station comprises a satellite transceiver of a satellite-cellular communication system, wherein the second radio communication station comprises a user terminal of a satellite-cellular communication system, and wherein the paging signals transmitted on the forward-link channel are transmitted upon a regular paging channel defined for regular paging in the satellite-cellular communication system.

13. The communication circuitry according to claim 1, wherein said first radio communication station comprises a satellite transceiver of a satellite-cellular communication system, wherein the second radio communication station comprises a user terminal of a satellite-cellular communication system, and wherein the paging signals comprise high penetration short message service signals defined in the satellite-cellular communication system.

14. A method for initiating communication in a radio communication system having a first radio communication station and a second radio communication station, said method comprising the steps of:

transmitting a paging signal from said first radio communication station to said second radio communication station;

returning an acknowledgment signal, generated at said second radio communication station, responsive to reception by said second radio communication station of the paging signal, the acknowledgment signal of a selected margin level for acknowledging said reception of the paging signal; and correlating said acknowledgment signal within said first radio communication station using a multiplicity of correlators therein, each said correlator correlating a respective subsequence of said acknowledgment signal, the number of said correlators being equal to the number of subsequence partitions of said acknowledgment signal, said acknowledgment signal being acknowledged after said correlating.

15. The method according to claim 14, further comprising the step of:

retransmitting said paging signal from said first radio communication station to said second radio communication station at an increased margin level responsive to times in which said second radio communication station fails to acknowledge the reception of the paging signal.

16. The method according to claim 14, wherein said acknowledgment signal received at said first radio communication station is one command, and each correlator correlates the respective subsequence of said acknowledgment signal.

17. The method according to claim 14, wherein said acknowledgment signal received at said first radio communication station comprises a multiplicity of subsignals therein, said multiplicity of subsignals corresponding to said multiplicity of correlators, and each of said correlators correlating a respective one of said multiplicity of subsignals.

18. The method according to claim 17, wherein each of said multiplicity of subsignals are identical.

19. The method according to claim 17, wherein each of said multiplicity of subsignals are different.

20. The method according to claim 17, wherein at least two of said multiplicity of subsignals are different.

* * * * *